F. S. CRABTREE.
SALT AND PEPPER SHAKER.
APPLICATION FILED JULY 11, 1917.
1,284,248.
Patented Nov. 12, 1918.
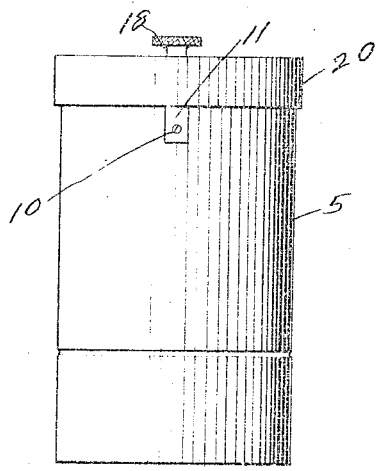
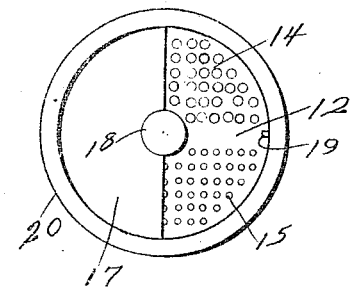
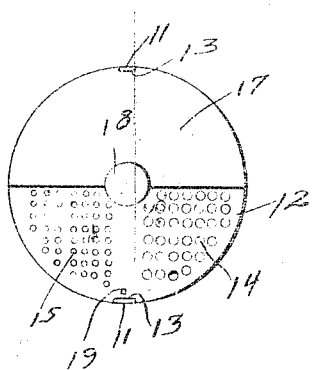
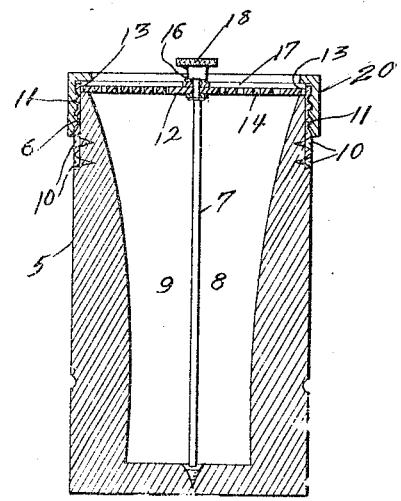
Witnesses
W. Moore
C. C. Chandler
Inventor
F. S. CRABTREE
By Chandler & Chandler
Attorneys

UNITED STATES PATENT OFFICE.

FRANK S. CRABTREE, OF NORTH HANCOCK, MAINE.

SALT AND PEPPER SHAKER.

1,284,248.

Specification of Letters Patent.

Patented Nov. 12, 1918.

Application filed July 11, 1917. Serial No. 179,895.

*To all whom it may concern:*

Be it known that I, FRANK S. CRABTREE, a citizen of the United States, residing at North Hancock, in the county of Hancock, State of Maine, have invented certain new and useful Improvements in Salt and Pepper Shakers; and I do hereby declare the following to be a full, clear, and exact description of the invention, such as will enable others skilled in the art to which it appertains to make and use the same.

This invention relates to improvements in condiment holders and is directed more particularly to combined salt and pepper shakers.

An object of the present invention resides in the provision of a combined salt and pepper shaker embodying a salt and a pepper compartment and a disk provided with a series of large and a series of small perforations registering respectively with the salt and pepper compartments, means of novel construction and arrangement being provided for assuring the correct positioning of the disk with its perforations registering with the proper compartments.

With the above and other objects of similar nature in view, the invention consists in the construction, combination and arrangement of parts, set forth in and falling within the scope of the appended claim.

In the drawing:—

Figure 1 is a side elevation of a condiment holder constructed in accordance with the invention.

Fig. 2 is a top plan view thereof.

Fig. 3 is a vertical longitudinal sectional view through the holder.

Fig. 4 is a view similar to Fig. 2 with the screw cap removed.

Referring now more particularly to the accompanying drawing, there is illustrated a combined salt and pepper shaker consisting of a cylindrical container 5 which may be constructed of glass, metal or other suitable material and is provided at its upper or open end with external threads 6. Mounted within the container 5 is a partition 7 whereby the container is divided into a salt compartment 8 and a pepper compartment 9. Secured as at 10 exteriorly and at diametrically opposite sides of the container are a pair of projections 11 the same extending beyond the open end of the container and one being of greater width than the other as is clearly indicated.

A disk 12 is provided to removably seat upon the open end of the container and is provided at diametrically opposite points in its periphery with recesses 13 which are of a width corresponding to that of the projection 11 and removably receive the extended ends thereof. The disk 12 is provided with a series of relatively large perforations 14 and a series of relatively large perforations 15 registering respectively with the salt and pepper compartments 8 and 9, while pivoted as at 16 centrally of the disk and movable over the top face thereof is a substantially semi-circular plate or slide 17.

A knob 18 is fixed to the slide 17 whereby it may be conveniently rotated while a pin 19 is carried by the disk to limit movement of the slide in both directions. In order to secure the disk 12 upon the container a screw cap 20 is provided to engage the threaded exterior of the container as will be readily understood.

It is evident that the provision of relatively wide and narrow projections and recesses will insure the correct positioning of the disk so that the large and small perforations will at all times register with the proper compartments.

What I claim is:—

A holder of the character described, comprising a cylindrical body open at one end and closed at its opposite end, the open end of the body being externally reduced and threaded, a partition within the body for dividing the same into independent compartments, ears inserted at diametrically opposite points in the outer reduced end of the body, a disk seated upon the open end of the body and having recesses receiving said ears, an internally threaded collar detachably engaged on the externally reduced threaded end of the body and engaging the disk, said disk being provided with series of relatively large and small perforations registering with the respective compartments, and a slide pivotally connected centrally of the disk and adapted to cover approximately one-half thereof said slide having a hand knob.

In testimony whereof, I affix my signature in the presence of two witnesses.

FRANK S. CRABTREE.

Witnesses:
HARRY L. CRABTREE,
ANNIE E. HINLEY.